May 6, 1924.
J. W. TURRENTINE
COUNTERCURRENT LIXIVIATOR
Filed Oct. 25, 1922
1,492,656
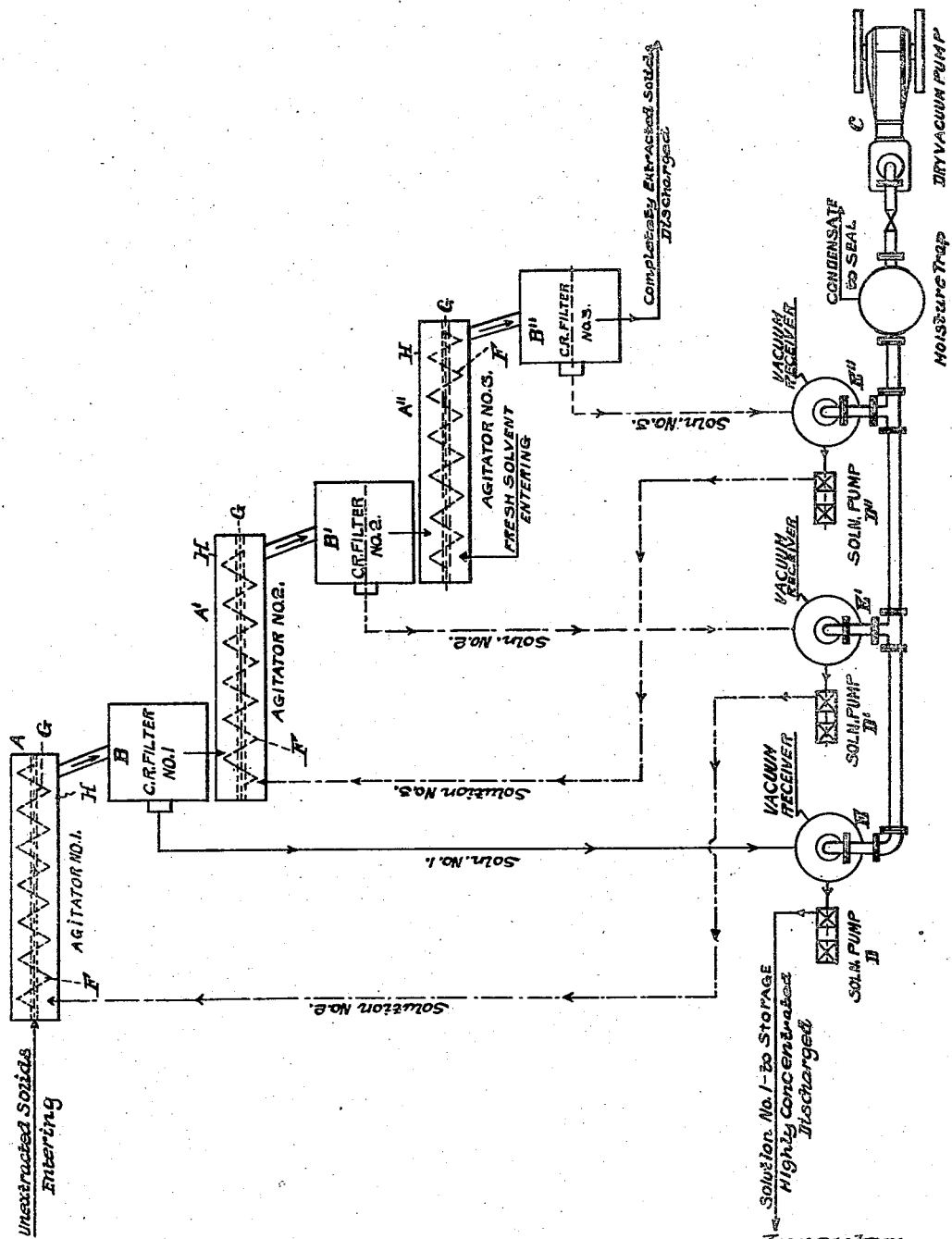

Patented May 6, 1924.

1,492,656

UNITED STATES PATENT OFFICE.

JOHN W. TURRENTINE, OF SANTA BARBARA, CALIFORNIA, DEDICATED, BY MESNE ASSIGNMENTS, TO THE PEOPLE OF THE UNITED STATES FOR THEIR FREE USE AND ENJOYMENT.

COUNTERCURRENT LIXIVIATOR.

Application filed October 25, 1922. Serial No. 596,890.

(FILED UNDER THE ACT OF MARCH 3, 1883, 22 STAT. L., 625.)

*To all whom it may concern:*

Be it known that I, JOHN W. TURRENTINE, a citizen of the United States, and an employee of the United States Department of Agriculture, residing at Santa Barbara, Calif., have invented a new and useful Countercurrent Lixiviator, of which the following is a full, clear, and exact specification.

This application is made under the act of March 3, 1883, chapter 143 (22 Stat. 625), and the invention herein described and claimed may be used by the Government of the United States or any of its officers or employees in the pursuit of work for the Government, or by any other person in the United States without payment to me of any royalty thereon.

This invention relates to an automatic, continuous, multiple-stage, countercurrent lixiviator, making use of the vacuum filtration principle.

The principle of countercurrent leaching is old, as is also the principle of vacuum filtration. The originality that is claimed for the present invention is that it is a combination of the two. Being that, it makes possible the exact and efficient filtering afforded by the most improved vacuum filters, and at the same time yields all of the great and sometimes essential economies of the countercurrent application of a solvent. There are instances that may be cited where efforts to utilize raw materials have been abandoned because of the impossibility of securing highly concentrated solutions by old extraction methods.

My invention is applicable to the whole great list of materials that may be filtered on rotary filters, and thus affords a wide extension of the field over which countercurrent extraction is possible. Being elastic, it can be applied as easily to extractions requiring a large number of applications of the solvent as to those requiring only a few. Old methods of countercurrent leaching are slow, intermittent, and involve generally a high cost for installation, require a large floor space, and where corrosive solvents are employed are practically prohibitive on account of the cost of non-corrosive materials of construction. The employment of my invention involves a moderate expense for installation, operation and upkeep; has a large proportional capacity; may be compactly built, and occupies a small floor space; and easily admits of acid-proof construction.

The most efficient extraction is obtainable for a given volume of solvent when the solid to be extracted is vigorously stirred with the solvent at the optimum temperature, and then filtered. The solvent is removed as completely as possible, and a fresh portion added; each time the smallest amount of solvent being applied as still allows the mixture to flow. This method of applying a solvent is made possible by my invention, and it is claimed that it is the only system that does make this possible in a continuous and automatic manner.

The invention is shown in the accompanying drawing which consists of one figure, which represents a plan view of the lixiviator.

Referring to the drawing the apparatus consists of units A and B, A' and B', A" and B", each unit being made up of an extraction chamber, here designated an agitator A, A', A", and a filter B, B', B". The agitator A, A' and A", and filters B, B', and B" may be of a type dictated by the requirements of the application.

The type of agitator A, A' and A" found advantageous is one built in the shape of a trough H with agitating paddles F arranged on a shaft G extending the long axis of the trough H. Since the suspension of the material undergoing extraction in the solvent forms a sludge which flows through the agitator A, A' and A" the length of the trough H and the speed of flow of the sludge determines the length of time each particle of the solid is forced to remain in contact with the extracting agent. However, the shape of the agitator may be left to the dictates of the application and the method of stirring likewise. The agitator may be opened or closed, or may be provided with hinged lids so that it may be opened or closed. Likewise, its material of construction may be, as required, of wood, or steel, or acid-proof metal, or provided with acid-proof coatings. It may be steam-jacketed or heated with steam coils, or insulated or refrigerated, providing for the optimum temperature conditions.

The filters B, B' and B" may be any of the continuous filters, but is preferably a rotary, vacuum filter with several vacuum compartments and one compartment to receive compressed air or steam to aid in the removal of the filter cake.

For viscous liquids too thick and sluggish to be filtered by pressures limited to the atmosphere, high speed centrifugals or centrifugal or pressure filters may be substituted for the vacuum filters. In cases where these are not continuous, the flow of sludge from the agitator to the filter is suspended while the filter is being discharged; during which short interval the agitator is required to act as a reservoir.

Supplemental apparatus, such as vacuum C and solvent pumps D, D', and D", vacuum receivers E, E' and E", lines and valves, may be of a standard or special type as desired.

In construction, the various units are placed in the series in echelon order with respect to one another, as likewise are the agitator and filter in the unit with respect to each other. Thus, the mixture of solids undergoing extraction and the solvent, forming a sludge, flows by gravity from the agitator into the filter tank. And, likewise, the filtered solids fall by gravity from the filter of one unit into the agitator of the next unit. This takes place continuously and automatically. The filtrate or solvent removed by filtration is delivered from the filter of one unit to the agitator of the next one above it. Thus, the solids pass down hill by gravity, and the solvent is passed up hill by means of pumps.

In application, the solid to be extracted is admitted to the agitator of the unit at one end of the system and the fresh solvent to the agitator of the unit at the opposite end. Thus, the fresh solids are admixed with the solvent delivered from the filter of the next unit, which solvent has traversed the entire series of agitators and filters and has come successively into intimate contact with the solids in every preceding agitator, and has become more and more concentrated in the compounds to be dissolved as it has advanced through the system. Finally coming into contact with the fresh, untreated solids, unless already saturated, it dissolves that part of the soluble solids most easily dissolved, and is then ready to be discharged as the spent solvent or as the practically saturated solution ready for further processing.

At the opposite end, the fresh solvent is admixed with the solids delivered from the filter of the next unit; and, these solids, having traversed the entire series of agitators, have come successively into intimate contact with the solvent in every preceding agitator, and have become more and more nearly completely extracted of the compounds to be removed as they have advanced through the system. Finally coming into contact with the fresh solvent, unless already completely extracted, they yield that part of the extractable material most difficult to dissolve; and are then ready to be discharged as the spent solids or as the completely extracted material ready for further processing.

Each unit delivers a solution somewhat more concentrated than the succeeding one, and a filter cake of solids somewhat more nearly completely extracted than the preceding one.

The system is as applicable to the development of a concentrated solution for further processing or the complete exhaustion of a solvent as to the complete extraction of a solid. It can be made to do both simultaneously. It does both continuously and automatically.

This process has been employed successfully in the lixiviation of kelp charcoal and its efficacy abundantly demonstrated.

I claim:

A continuous, automatic countercurrent lixiviator comprising a series of units, the same being disposed in echelon order with respect to one another and each being composed of an extraction chamber and filter, the former being placed preferably above the latter so as to admit of gravity flow of the contents of the extraction chamber upon the filter, means for introducing fresh solvent into the extraction chamber of the lowest unit of the series, means for introducing into said extraction chamber nearly completely extracted and filtered solids from the filter of the next preceding and higher unit and which have traversed said series from the highest to the lowest unit undergoing progressive extraction the while, means for mixing said solvent with said solids, means for discharging the mixture of said solvent and solids from the extraction chamber upon the filter of said unit, means for discharging the completely extracted and filtered solids from said filter, means for lifting the solvent from said filter and discharging same into the extraction chamber of the next higher unit, means for discharging into said extraction chamber the partially extracted and filtered solids for the next preceding and higher unit, means for mixing said solvent and solids, and repeating said operation with respect to the other units of said series until the series of units from the lowest to the highest have been traversed by the solvent, the solvent the while becoming progressively more concentrated in compounds extracted from the solids, means for introducing fresh solids from which compounds are to be extracted into the extraction chamber of the highest unit of the series, means for introducing into said extraction chamber the solvent from the filter of the next lower and succeeding unit which has traversed the series of units upward from the lowest to the highest inclusive, means for mixing said solids and solvent, means for discharging mixture of said solids and solvent upon the filter of said highest unit, means for discharging the practically spent solvent from the filter of each unit, means for discharging the partially extracted and filtered solids from the filter of each unit into the extraction chamber of next lower and succeeding unit, means for introducing into said extraction chamber the partially spent solvent from the filter of the unit next below and following the said unit, and means for agitating the mixture of said solids and solvent in the extraction chamber of each unit.

JOHN W. TURRENTINE.